United States Patent Office 3,714,357
Patented Jan. 30, 1973

---

3,714,357
PHARMACEUTICAL COMPOSITIONS COMPRISING QUINUCLIDINOL DERIVATIVES
Claude Gueremy, Houilles, Robert Labey, Le Vesinet, and Roger Thevenot, Paris, France, assignors to Societe Generale de Recherches d'Applications Scientifiques "Sogeras," Paris, France
No Drawing. Filed July 15, 1969, Ser. No. 841,970
Claims priority, application Great Britain, July 15, 1968, 33,564/68
Int. Cl. A61k 27/00
U.S. Cl. 424—267
19 Claims

ABSTRACT OF THE DISCLOSURE

Pharmaceutical compositions comprising a quinuclidinol derivative and an inert physiologically acceptable carrier have useful cholinolytic properties.

---

This invention is concerned with certain quinuclidinol derivatives, and particularly pharmaceutical compositions containing them.

We have found that quinuclidinol derivatives of the formula

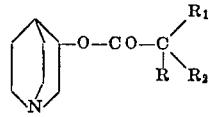

(I)

in which R is H, OH or an alkyl group having 1 to 4 carbon atoms;
$R_1$ is a phenyl or thienyl group, and
$R_2$ is a cyclohexyl, cyclopentyl or thienyl group, or, when R is H, $R_1$ and $R_2$ together with the carbon atom to which they are attached, form a tricyclic group of the formula

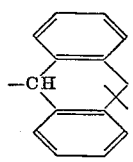

(II)

in which X is —O—, —S— or —CH$_2$—, and their acid addition and quaternary ammonium salts, have valuable pharmacological properties, particularly in the cholinolytic field.

The compounds of Formula I and their acid addition and quaternary ammonium salts are novel compounds and constitute one aspect of the present invention.

According to the nature of the R substituent, these compounds may be prepared by one or the other of the two following methods.

When R is H or alkyl, an acid chloride of the formula

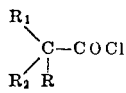

is reacted with 3-quinuclidinol. It is advantageous to carry out the reaction in an inert solvent, such as benzene or toluene, at the boiling temperature of the solvent and, if desired, in the presence of an acid binding agent. Preferred acid binding agents are alkali metal derivatives of 3-quinuclidinol, advantageously the sodium derivative.

When R is OH, the compounds can be prepared by transesterification of the quinuclidinol with an ester of the formula

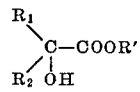

in which R' is methyl or ethyl.

The reaction is generally carried out in the presence of an alkali metal alcoholate having a low molecular weight, for example sodium methylate or ethylate, under reflux and in the presence of an inert solvent which is capable of forming an azeotropic mixture with the R'OH alcohol formed, for example heptane or toluene, the azeotropic mixture, and thus the alcohol R'OH, being removed from the reaction mixture.

The compounds of Formula I may be purified by physical methods, such as distillation, crystallization or chromatography, and/or by chemical methods, such as the formation of a salt and regeneration of the base by treating the salt with an alkaline medium.

The compounds of Formula I can be converted into addition salts by the action of mineral or organic acids in an appropriate solvent, for example alcohols, ethers, ketones or chlorine-containing solvents, and into quaternary ammonium salts by the action of mineral or organic esters, where required in a solvent, at ambient temperature or with slight heating.

The following examples are given by way of illustration only:

EXAMPLE 1

3-(2-cyclohexyl-2-hydroxy-2-phenylethanoyloxy)-quinuclidine

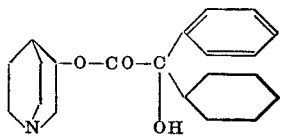

13.2 g. of methyl 2-cyclohexyl-2-hydroxy-2-phenylethanoate and 11.6 g. of 3-quinuclidinol were added to a suspension of 0.54 g. of sodium methylate in 160 ml. of anhydrous heptane. The mixture was heated to reflux temperature for 4 hours, the methanol formed being eliminated by azeotropic entrainment using a Dean-Stark apparatus. 80 ml. of heptane were then evaporated on a water bath at 50° C. under reduced pressure, and 200 ml. of ethyl acetate were added to the resulting suspension. The insoluble products were separated by filtration and washed twice with a total of 100 ml. of ethyl acetate. The combined organic solutions were extracted three times with a total of 150 ml. of iced N aqueous hydrochloric acid. The combined acid solutions were rendered alkaline in an ice bath with 90 ml. of a saturated aqueous solution of potassium carboante. The oil that was salted out, was extracted four times with a total of 400 ml. of ether. The combined ethereal solutions were washed four times with a total of 400 ml. of distilled water, dried with anhydrous magnesium sulphate and evaporated. The residue (11.9 g.) was recrystallized seven times in boiling acetonitrile. 1.4 g. of 3 - (2 - cyclohexyl-2-hydroxy-2-phenyl-ethanoyloxy)-quinuclidine, in the form of a pure diastereoisomer, melting at 143° C., were obtained. The filtrates of the successive recrystallization were collected and evaporated, and the residue was recrystallized in a minimum of boiling acetonitrile. 5.8 g. of 3-(2-cyclohexyl-2-hydroxy-2-phenyl-ethanoyloxy)-quinuclidine, in the form of a mixture of the two diastereoisomers, melting at 98–100° C., were obtained.

3-quinuclidinol can be prepared by the catalytic reduction of 3-quinuclidinone as described by C. A. Grob et coll., Helv. Chim. Acta, 40 (1957), 2170.

Methyl 2-cyclohexyl-2-hydroxy-2-phenyl-ethanoate can be prepared by esterifying the corresponding acid as described by A. B. H. Funcke et coll., Arzneim.-Forsch., 10 (1960), 767.

EXAMPLE 2

3-(2-cyclopentyl-2-hydroxy-2-phenyl-ethanoyloxy)-quinuclidine

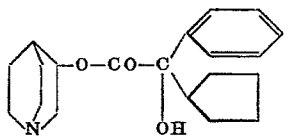

11.0 g. of methyl 2-cyclopentyl-2-hydroxy-2-phenyl-ethanoate and 10.5 g. of 3-quinuclidinol were added to a suspension of 0.47 g. of sodium methylate in 150 ml. of anhydrous heptane. The mixture was heated to reflux temperature for 4 hours, the resulting methanol being eliminated by azeotropic entrainment using a Dean-Stark apparatus. 100 ml. of heptane were then evaporated on a water bath at 50° C. under reduced pressure, and 200 ml. of ethyl acetate were added to the resulting suspension. The insoluble products were separated by filtration and washed with 100 ml. of ethyl acetate. The combined organic solutions were extracted three times with a total of 300 ml. of iced N aqueous methane-sulphonic acid. The combined acid solutions were rendered alkaline on an ice bath with 150 ml. of a saturated aqueous solution of sodium carbonate. The oil that was salted out, was extracted three times with a total of 300 ml. of ether, the combined ethereal solutions were washed five times with a total of 1250 ml. of distilled water until neutral, dried on anhydrous magnesium sulphate and evaporated. 12.5 g. of oil were obtained, of which 10 g. dissolved in 20 ml. of isopropanol were treated with 8 ml. of a solution of anhydrous hydrochloric acid in anhydrous ether containing 3.8 mols of acid per litre of solution. After cooling for 2 hours at 3° C., the crystals that appeared were filtered off and dissolved in 85 ml. of isopropanol under reflux. The hot solution was filtered and cooled for one night at 3° C. The crystals that appeared were filtered off, washed twice with a total of 30 ml. of iced isopropanol and dried under reduced pressure (1 mm. of mercury) at 40° C. 7.7 g. of 3-(2-cyclopentyl-2-hydroxy-2-phenyl-ethanoxyloxy)-quinuclidine hydrochloride, in the form of a mixture of two diastereoisomers, melting at 244–246° C., were obtained.

Methyl 2-cyclopentyl-2-hydroxy-2-phenyl-ethanoate can be prepared by esterification with diazomethane of the corresponding acid.

EXAMPLE 3

1-methyl-3-(2-cyclohexyl-2-hydroxy-2-phenyl-ethanoyloxy)-quinuclidinium bromide 45 ml. of a solution of methyl bromide in methanol (containing 2 mols of methyl bromide per litre of solution) were added to a solution of 10.4 g. of 3-(2-cyclohexyl-2-hydroxy-2-phenyl-ethanoyloxy)-quinuclidine in 50 ml. anhydrous methanol. The solution was kept in a dry place for 2 hours at room temperature and then evaporated to dryness under reduced pressure on a water bath at 50° C. 100 ml. of anhydrous ether were added dropwise, with stirring, to the residue dissolved in 25 ml. of acetonitrile. The crystals which formed were filtered, washed twice with a total of 50 ml. anhydrous ether and dried under reduced pressure (1 mm. mercury) at 40° C. 8.15 g. of 1-methyl-3-(2-cyclohexyl-2-hydroxy-2-phenyl-ethanoyloxy)-quinuclidinium bromide were obtained in the form of a mixture of diastereoisomers melting at 160° C.

EXAMPLE 4

1-methyl-3-(2-cyclopentyl-2-hydroxy-2-phenyl-ethanoyloxy)-quinuclidinium bromide 7.5 g. of 3-(2-cyclopentyl-2-phenyl-2-hydroxy-ethanoyloxy)-quinuclidine were dissolved in 35 ml. of a solution of methyl bromide in methanol (containing 2 mols methyl bromide per litre of solution). The solution was kept in a dry place for 2 hours at room temperature, then evaporated to dryness under reduced pressure on a water bath at 50° C. and the residue was dissolved in 20 ml. of boiling isopropanol. After cooling overnight to 3° C., the crystals which formed were filtered, washed in 5 ml. of iced isopropanol and then washed twice with a total of 40 ml. of anhydrous ether and dried under reduced pressure (1 mm. mercury) at 40° C. 8.2 g. of 1-methyl-3-(2-cyclopentyl-2-phenyl-2-hydroxy-ethanoyloxy) - quinuclidinium bromide were obtained in the form of a mixture of diastereoisomers melting at 150°152° C.

EXAMPLE 5

3-[2-phenyl-2-(2-thienyl)-2-hydroxy-ethanoyloxy]-quinuclidine

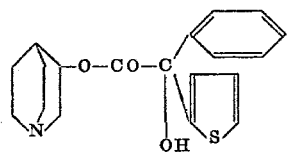

The method of Example 1 was repeated; 3 g. of oily base were obtained from 2.5 g. of 3-quinuclidinol and 5 g. of methyl 2-phenyl-2-hydroxy-2-(2-thienyl)-ethanoate. After crystallization from 30 ml. of boiling acetonitrile and drying under reduced pressure (1 mm. mercury) at 40° C., 2.2 g. of 3-[2-hydroxy-2-phenyl-2-(2-thienyl)-ethanoyloxy]-quinuclidine were obtained in the form of a pure diastereoisomer melting at 134° C.

Methyl 2-phenyl-2-hydroxy-2-(2-thienyl)-ethanoate can be prepared by the condensation of magnesium 2-thienyl-bromide with methyl phenyl glyoxylate as described by B. J. Martell et al., I. Pharm. Sci., 52, (1963), No. 4, 331.

EXAMPLE 6

3-[2-(2-thienyl)-2-cyclopentyl-2-hydroxy-ethanoyloxy]-quinuclidine

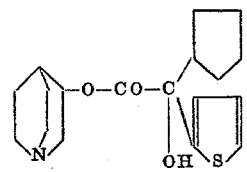

0.6 g. of sodium ethylate and 2.6 g. of ethyl 2-(2-thienyl)-2-cyclopentyl-2-hydroxy-ethanoate were added to a suspension of 0.85 g. of 3-quinuclidinol in 25 ml. of anhydrous toluene. The mixture was slowly heated for 2 hours 30 minutes and the azeotrope formed by the liberated ethanol and the toluene was distilled. When the internal temperature reached 110° C., 15 ml. of distillate had been collected. 15 ml. of anhydrous toluene were added and slow distillation was continued. Heating was stopped after a further 15 ml. of distillate had been collected. 15 ml. of distilled water followed by 15 ml. of ether was added dropwise to the remaining solution while cooling on an ice bath. The decanted aqueous phase was extracted twice with a total of 30 ml. of ethyl acetate. The combined organic fractions were washed twice with a total of 20 ml. of distilled water and then extracted three times with a total of 45 ml. of iced N aqueous methanesulphonic acid. The combined acid extracts were cooled on an ice bath and then made alkaline by adding 12 ml. of a saturated aqueous solution of potassium carbonate. The oil which salted out was extracted three times with a total of 60 ml. of ethyl acetate. The combined organic extracts were washed twice with a total of 20 ml. of distilled water, dried over anhydrous magnesium sulphate and evaporated under reduced pressure on a water bath at 40° C. The oily residue (2 g.) was dissolved in 2.5 ml. ether and 8 ml. of isopropyl oxide were added to the solution obtained. After cooling for 2 hours to 3° C., the crystals which formed were filtered, washed with 5 ml. of cold isopropyl oxide and dried under reduced pressure at room temperature. 1.3 g. of 3-[2-(2-thienyl)-2-cyclopentyl-2-hydroxy - ethanoyloxy] - quinuclidine were obtained in the form of a mixture of diastereoisomers melting at 130° C. After recrystallization twice from acetonitrile, a pure diastereoisomer was obtained, melting at 135° C.

Ethyl 2-(2-thienyl)-2-cyclopentyl-2-hydroxy-ethanoate can be prepared by the condensation of magnesium cyclopentyl bromide with ethyl (2-thienyl)-glyoxylate by a method similar to that described by B. J. Martell et al., J. Pharm. Sci., 52, (1963), No. 4, 331.

EXAMPLE 7

3-[2,2-di-(2-thienyl-2-hydroxy-ethanoxyloxy]-quinuclidine

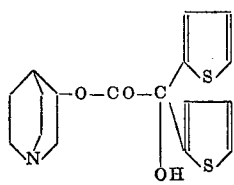

The same method was used as in Example 6; 1.3 g. of crude crystallized base were obtained from 3.2 g. of ethyl, 2,2-di(2-thienyl)-2-hydroxy-ethanoate and 1 g. of 3-quinuclidinol. After recrystallization from 13 ml. of boiling acetonitrile and drying under reduced pressure at room temperature, 1 g. of 3-[2,2-di(2-thienyl)-2-hydroxy-ethanoyloxy]-quinuclidine was obtained in the form of a pure diastereoisomer melting at 153° C.

Ethyl 2,2-di(2-thienyl)-2-hydroxy-ethanoate can be prepared by the condensation of magnesium 2-thienyl iodide with ethyl (2-thienyl)-glyoxylate as described by F. Leonard et al., J. Am. Chem. Soc., 73, 1951), No. 5, 2216.

EXAMPLE 8

1-methyl 3-[2,2,-di(2-thienyl)-propionyloxy]-quinuclidinium bromide

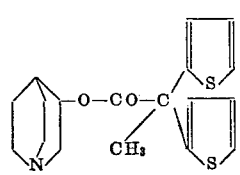

1.3 ml. of thionyl chloride was added to a solution of 1.7 g. of 2,2-di(2-thienyl)-propionic acid in 20 ml. of anhydrous chloroform on an ice bath. The solution was refluxed for 90 minutes and then evaporated under reduced pressure on a water bath at 40° C. The residue was taken up in 20 ml. of anhydrous benzene and the benzene was evaporated under the same conditions. The oily residue (1.84 g.) was dissolved in 10 ml. of anhydrous benzene and the solution obtained was added dropwise to a solution of 1.07 g. of the sodium derivative of 3-quinuclidinol in 15 ml. of anhydrous benzene cooled on an ice bath. The reaction mixture was refluxed for 3 hours 30 minutes and then cooled on an ice bath. After adding 25 ml. of ether the suspension was extracted three times with a total of 50 ml. of N aqueous hydrochloric acid. The combined acid extracts were washed twice with a total of 20 ml. ether and made alkaline on an ice bath by adding 6 ml. of 10 N caustic soda solution. The oil which salted out was extracted three times with a total of 90 ml. of ethyl acetate. The combined organic extracts were washed three times with a total of 30 m. of distilled water, dried over anhydrous magnesium sulphate and evaporated under reduced pressure on a water bath at 40–50° C. 1.5 g. of oily base were obtained, out of which 1.3 g. of was converted to the bromomethylate by adding 2.6 ml. of isopropanol and 15 ml. of an acetone solution of methyl bromide containing 2 mols of methyl bromide per litre of solution. The solution obtained was cooled to 3° C. and the crystals which formed were filtered, washed with 5 ml. of acetone and dried at room temperature under reduced pressure. 1.3 g. of 1-methyl 3-[2,2-di(2-thienyl)-propionyloxy]-quinuclidinium bromide were obtained, melting at 152° C.

The sodium derivative of 3-quinuclidinol can be prepared by adding the calculated quantity of sodium to a solution of quinuclidinol in benzene, refluxing the solution for 22 hours and evaporating the benzene.

2,2-di(2-thienyl)-propionic acid can be prepared by the action of pyruvic acid on thiophene as described by M. Sy et al., Bull. Soc. Chim. France (1967), No. 7, 2609.

EXAMPLE 9

3-(2-cyclohexyl-2-phenyl-ethanoyloxy)-quinuclidine

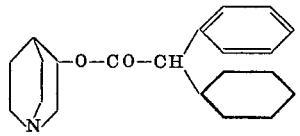

5 g. of α-cyclohexyl-phenylacetic acid were dissolved at room temperature in 25 ml. of thionyl chloride. After refluxing for 2 hours, the solution was evaporated at reduced pressure on a water bath at 30–35° C. The residue was dissolved in 30 ml. of anhydrous benzene and the solution was evaporated under the same conditions. The acid chloride obtained (5.4 g.) was dissolved in 20 ml. of anhydrous benzene and added dropwise to a suspension of 3.4 g. of the sodium derivative of 3-quinuclidinol in 50 ml. of anhydrous benzene. The reaction mixture was refluxed for 2 hours 30 minutes and then treated according to the method described in Example 8. 5.3 g. of oil were obtained, out of which 4.4 g. was dissolved in 20 ml. of boiling ethyl acetate. The hot solution was added to a hot solution of 1.56 g. maleic acid in 15 ml. ethyl acetate. After cooling for 4 hours to 3° C., the crystals which formed were filtered, washed with 5 ml. of cold ethyl acetate and dried at room temperature under reduced pressure. 3.5 g. of 3-(2-cyclohexyl-2-phenyl-ethanoyloxy)-quinuclidine maleate were obtained in the form of a mixture of diastereoisomers melting at 105° C.

EXAMPLE 10

3-[2-phenyl-2-(2-thienyl)-ethanoyloxy]-quinuclidine

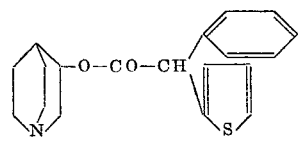

1.05 g. of α-(2-thienyl)-α-phenylacetic acid were dissolved in 5 ml. of thionyl chloride and the solution was agitated for 4 hours at room temperature and then evaporated under reduced pressure on a water bath at 45° C. The residue was dissolved in 10 ml. of anhydrous benzene and the solution was evaporated under the same conditions. The solution of the crude residual acid chloride in 5 ml. of anhydrous benzene was added dropwise to a suspension of 0.7 g. of the sodium derivative of 3-quinuclidinol in 10 ml. benzene, and the mixture was refluxed for 2 hours 30 minutes. After treatment by the method described in Example 8, 1 g. of oily base was obtained, out of which 0.6 g. was dissolved in 6 ml. of boiling acetone.

The hot solution was added to a boiling solution of 0.16 g. anhydrous oxalic acid in 1.7 ml. acetone. After cooling for 2 hours at 3° C., the crystals which formed were filtered, washed with 2 ml. of acetone and dried at ambient temperature under reduced pressure. 0.7 g. of 3-[2-phenyl-2-(2-thienyl)-ethanoyloxy]-quinuclidine oxalate was obtained in the form of a mixture of diasteroisomers melting at 140° C.

α-(2-thienyl)-α-phenylacetic acid can be prepared by the reduction of α-(2-thienyl)-phenyl-glycolic acid with stannous chloride as described in U.S. Patent No. 2,541,024.

EXAMPLE 11

3-(9-xanthenyl-carboxy)-quinuclidine

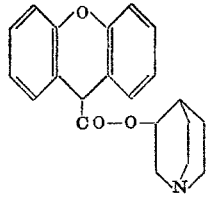

20 ml. of freshly distilled thionyl chloride were added to a suspension of 25 g. of 9-carboxy-xanthene in 90 ml. of carbon tetrachloride. The mixture was heated to reflux temperature for 2½ hours; the excess carbon tetrachloride and thionyl chloride were then evaporated off on a water bath at 40° C. under reduced pressure. The residue was dissolved in 300 ml. of anhydrous benzene, and the benzene was evaporated under the same conditions. 19.1 g. of 3-quinuclidinol and 800 ml. of anhydrous benzene were added to the residue and the mixture was heated to reflux temperature for 6 hours.

After cooling to 10° C., the resulting suspension was treated in an ice bath successively with 800 ml. of distilled water, 70 ml. of 10 N caustic soda solution and 35 g. of potassium carbonate, the temperature of the mixture never exceeding 7° C. The aqueous solution was decanted and extracted four times with a total of 2 l. benzene. The combined benzene solutions were extracted three times with a total of 1250 ml. of N aqueous methanesulphonic acid. The combined acid solutions were rendered alkaline on an ice bath by the addition of 130 ml. of 10 N caustic soda solution, the internal temperature never exceeding 10° C. The oil that salted out, was extracted three times with a total of 900 ml. of benzene. The combined benzene solutions were washed twice with a total of 400 ml. of distilled water until neutral, dried on anhydrous magnesium sulphate and evaporated. To the residue (23.8 g.) dissolved in 72 ml. of isopropanol, there were added, on an ice bath, 23.7 ml. of a solution of anhydrous hydrochloric acid in anhydrous ether containing 3.8 mols of acid per litre of solution. After cooling for 2 hours to 3° C., the crystals that appeared were filtered off, washed twice with a mixture of 20 ml. of isopropanol and 10 ml. of anhydrous ether and dried under reduced pressure (1 mm. Hg) at 60° C. 23.1 g. of 3-(9-xanthenyl-carboxy)-quinuclidine hydrochloride, melting at 224–226° C., were obtained.

9-carboxy-xanthene can be prepared by treating xanthene with sodium and then carbonating the sodium derivative as described by S. Akagi et coll., J. Pharm. Soc. Jap., 74 (1954), 608.

EXAMPLE 12

3-(9-xanthenyl-carboxy)-quinuclidine methobromide 10.8 g. of base were obtained by the decomposition of 14 g. of 3-(9-xanthenyl-carboxy)-quinuclidine hydrochloride in an alkaline medium.

9.7 g. of this base were dissolved in 50 ml. of anhydrous acetone. 30 ml. of a solution of methyl bromide in isopropanol containing 2 mols of methyl bromide per litre of solution, were added to the resulting solution. After cooling to 3° C. for 2½ hours, the crystals that appeared were filtered off, washed with 20 ml. of a mixture of 3 parts of isopropanol and 5 parts of acetone and then with 20 ml. of acetone, and dried at 50° C. under reduced pressure (1 mm. Hg). 11.3 g. of 1-methyl-3-(9-xanthenyl-carboxy)-quinuclidinium bromide, melting at 222–224° C. were obtained.

EXAMPLE 13

3-(9,10-dihydro-9-anthracenyl-carboxy)-quinuclidine

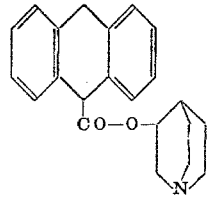

36.5 ml. of freshly distilled thionyl chloride were added to a suspension of 44.8 g. of 9-carboxy - 9,10 - dihydroanthracene in 160 ml. of carbon tetrachloride. The mixture was heated to reflux temperature for 5 hours and the excess carbon tetrachloride and thionyl chloride were then evaporated off on a water bath at 50° C. under reduced pressure. The residue was dissolved in 200 ml. of anhydrous benzene and the benzene was evaporated under the same conditions. 500 ml. of anhydrous benzene and 25.4 g. of 3-quinuclidinol were added to the residue. The suspension was heated to reflux temperature for 5 hours. After cooling, the suspension was treated with 300 ml. of 2 N aqueous methanesulphonic acid and 300 ml. of distilled water. The acid solution was decanted and the organic solution was extracted twice with a total of 300 ml. of 2 N aqueous methanesulphonic acid. The collected acid solutions were rendered alkaline in an ice bath by the addition of potassium carbonate until a pH of 10 was obtained. The precipitate formed was extracted four times with a total of 800 ml. of ethyl acetate. The combined organic solutions were washed five times with a total of 2 l. of water until neutral, dried on anhydrous magnesium sulphate and evaporated. The residue (57.2 g.) was dissolved in 80 ml. of boiling acetonitrile in the presence of 0.6 g. of animal charcoal. After filtration and cooling of the filtrate for 3 hours at 3° C., the crystals that appeared were filtered off, washed three times with a total of 60 ml. of ice acetonitrile and dried at ambient temperature under reduced pressure. 49.7 g. of 3 - (9,10 - dihydro-9-anthracenyl-carboxy)-quinuclidine, melting at 114–115° C., were obtained.

9-carboxy - 9,10 - dihydroanthracene can be prepared from 9,10-dihydroanthracene by lithiation followed by carbonation as described by R. A. Heacock et coll., Ann. Appl. Biol., 46 (1958), 352.

EXAMPLE 14

3-(9,10-dihydro-9-anthracenyl-carboxy)-quinuclidine methobromide 15 g. of 3-(9,10-dihydro-9-anthracenyl-carboxy)-quinuclidine were dissolved in 70 ml. of a solution of methyl bromide in methanol containing 2 mols of methyl bromide per litre of solution. 90 ml. of anhydrous ether were added drop by drop with stirring. After the whole had been cooled to 3° C. for 3 hours, the crystals that appeared were filtered off, washed with 20 ml. of a mixture of 7 parts of methanol and 9 parts of anhydrous ether and then with 30 ml. of anhydrous ether and dried at 70° C. under reduced pressure. 16.0 g. of 1-methyl-3-(9,10-dihydro-9-anthracenyl-carboxy) - quinuclidinium bromide, melting at 190° C., were obtained.

EXAMPLE 15

1-butyl-3-(9-xanthenyl-carboxy)-quinuclidinium bromide 12 g. of the base (prepared as in Example 11) were dissolved in 30 ml. of n-butyl bromide. The solution obtained was left in a dry place at room temperature for 2 hours, then evaporated under reduced pressure on a water bath at 60° C. The residue was dissolved in 25 ml. isopropanol. After cooling overnight to 3° C., the crystals which formed were filtered, washed with 10 ml. of iced isopropanol, then washed twice with a total of 100 ml. of anhydrous ether and dried under reduced pressure (1 mm. mercury) at 50° C. 9.3 g. of 3-(9-xanthenyl carboxy)-1-butyl-quinuclidinium bromide were obtained, melting at 158–160° C.

EXAMPLE 16

1-ethyl-3-(9-xanthenyl-carboxy)-1-ethyl-quinuclidinium bromide 12 g. of base (prepared as in Example 11) were dissolved in 30 ml. of ethyl bromide. The solution obtained was left in a dry place at room temperature for 2 hours, then evaporated under reduced pressure on a water bath at 60° C. The residue was dissolved in 25 ml. of iced isopropanol and then in 30 ml. of anhydrous ether, dried under reduced pressure (1 mm. mercury) at 40° C. 11.8 g. of 3-(9-xanthenyl-carboxy)-1-ethyl-quinuclidinium bromide were obtained, melting at 104–105° C.

EXAMPLE 17

3-(9-thioxanthenyl-carboxy)-quinuclidine

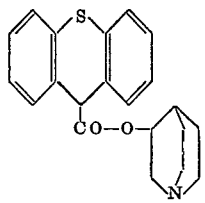

5.5 ml. of thionyl chloride were added to a suspension of 7.2 g. of 9-thioxanthene carboxylic acid in 75 ml. of carbon tetrachloride and the mixture was refluxed for 2 hours. The suspension obtained was evaporated to dryness under reduced pressure on a water bath at 40° C., the residue was dissolved in 50 ml. benzene, and the benzene was evaporated under the same conditions. 170 ml. of anhydrous benzene, followed by portions of 4.5 g. of the sodium derivative of 3-quinuclidinol were added to the 7.5 g. of crude acid chloride obtained. The reaction mixture was refluxed for 2 hours 30 minutes and then treated by the method described in Example 8 (an insoluble crystallised product was obtained during the acid extraction and was eliminated by filtration). 5 g. of oil were obtained which was dissolved in 25 ml. of boiling cyclohexane. After cooling for 2 hours to 3° C., the crystals which formed were filtered, washed with 7 ml. of cyclohexane at 10° C. and dried under reduced pressure at room temperature. 3 g. of 3-(9-thioxanthenyl-carboxy)-quinuclidine were obtained, melting at 118° C.

9-thioxanthene carboxylic acid can be prepared by the carbonation of the lithium derivative of thioxanthene as described by R. A. Heacock et al., Ann. Appl. Biol., 46, (1958), 352.

EXAMPLE 18

1-methyl 3-(9-thioxanthenyl-carboxy)-quinuclidinium bromide 17 ml. of an acetone solution of methyl bromide (containing 2 mols of methyl bromide per litre of solution) were added to a solution of 1.2 g. of 3-(9-thioxanthenyl-carboxy)-quinuclidine (prepared as in Example 17) in 2.4 ml. of isopropanol. The solution was kept in a dry place at room temperature for 1 hour, then cooled at 3° C. The crystals which formed were separated, washed with 5 ml. of acetone and dried at room temperature under reduced pressure. 1.5 g. of 1-methyl 3-(9-thioxanthenyl-carboxy)-quinuclidinium bromide were obtained, melting at 256° C.

As stated above, the novel compounds have valuable pharmacological properties, more particularly with regard to cholinolysis.

Although all the compounds possess these properties, the pharmaco-dynamic results have been divided into two groups corresponding to the different meanings of the general formula.

(A) Compounds of Formula I in which R=CH.—The pharmacological tests on compounds of this group were carried out in comparison with 3-(2,2-diphenyl-2-hydroxy-ethanoyloxy)-quinuclidine (hereinafter denoted by A) and its quaternary ammonium salt, quinuclidinium bromide (hereinafter denoted by B).

Acute toxicity

The acute toxicity was determined by Diechmann & LeBlanc's method (Deichmann, W., and LeBlanc, T. J., J. Ind. Hyg. Toxical., 25 (1943), 415–17). The approximate lethal doses in mg./kg. are shown in Table 1.

TABLE 1

| Compound example No. | Intravenous mouse | Subcutaneous— | |
|---|---|---|---|
| | | Mouse | Rat |
| A | 20 | 100 | 265 |
| 1 | 67 | 620 | >940 |
| | 67 | 230 | |
| 2 | 67 | 230 | 520 |
| B | 6.7 | 620 | 1,170 |
| 3 | 13 | 280 | 780 |
| 4 | 16 | 420 | 620 |

Experiments in vitro

Experiments in vitro were carried out by Magnus' method. The effects were measured on the following agonists:

Acetylcholine, on the duodenum of rats
Barium chloride, on the duodenum of rats
Histamine, on the ileum of guinea pigs
Nicotine, on the ileum of guinea pigs
Serotonin, on the colon of rats.

The concentrations which inhibited 50% of the contractions due to the agonist were determined and are shown in Table 2.

TABLE 2

| Compound example No. | Acetylcholine | Barium chloride | Histamine | Nicotine | Serotonin |
|---|---|---|---|---|---|
| A | 5.10⁻⁹ | | 8.10⁻⁷ | 5.10⁻⁷ | 2.10⁻⁶ |
| 1 | 6.10⁻⁹ | 7.10⁻⁶ | 7.10⁻⁷ | 6.10⁻⁵ | 3.10⁻⁵ |
| | 8.10⁻⁵ | 8.10⁻⁶ | 7.10⁻⁷ | 8.10/⁸ | 3.10⁻⁶ |
| 2 | 9.10⁻⁹ | 9.10⁻⁷ | 2.10⁻⁷ | | 5.10⁻⁷ |
| B | 3.10⁻⁹ | 7.10⁻⁹ | 5.10⁻⁶ | 8.10⁻⁸ | (¹) |
| 3 | 2.10⁻⁹ | 3.10⁻⁵ | 3.10⁻⁶ | 2.10⁻⁷ | (¹) |
| 4 | 5.10⁻⁹ | >1.10⁻⁵ | 5.10⁻⁶ | 5.10⁻⁶ | >1.10⁻⁵ |

¹ Inactive.

Effect on behavior

The effect on behavior was measured with a Dews-type actimeter with intersecting electric beams. The mice were treated subcutaneously, half an hour before being introduced into the actimeter, and their activity was measured for 15 minutes. 6 different doses of each product in logarithmically increasing amounts, were studied, and 6 mice were used for each dose.

The following symbols are used to denote the effects observed:

++: Considerable increase in activity
+: Increase in activity
±: Insignificant effect
—: Decrease in activity
— —: Considerable decrease in activity.

The results are shown in Table 3.

TABLE 3

| Compound example No. | Dose, mg./kg., subcutaneous | Effect |
|---|---|---|
| A | 0.1–10 | ++ |
|  | 30 | − |
| 1 | 0.03–30 | ++ |
|  | 100 | − − |
| 1 | 0.03–30 | ++ |
|  | 100 | − − |
| 2 | 0.03–10 | ++ |
| B | 3–30 | + |
|  | 100 | ± |
| 3 | 1–30 | ± |
|  | 100 | − − |
| 4 | 3–30 | ± |

Anticholinergic activity

The peripheral muscarinic anticholinergic activity was measured by the inhibition of chromodacrylorrhoea produced by the administration of methacholine in rats.

The following symbols are used:

±: Slight effect
+: Considerable effect
++: Very considerable effect
+++: Very considerable and lasting effect (e.g. atropine)

The central anticholinergic activity was measured by the inhibition of analgesia produced by oxotremorine in mice.

The activity is expressed as the $ED_{50}$, i.e. the dose which, when subcutaneously administered 15 minutes before the oxotremorine, suppresses the analgesia due to oxotremorine in 50% of the animals.

The anti-nicotinic activity was measured by the inhibition of tremors produced by the administration of nicotine in mice.

The activity of the products is expressed as the $ED_{50}$ (i.e. the dose which when administered subcutaneously, suppresses the tremors due to nicotine in 50% of the animals.

The results are shown in Table 4.

TABLE 4

| Compound example No. | Peripheral anticholinergic activity Mg./kg. | Peripheral anticholinergic activity Effect | Central anticholinergic activity, mg./kg. | Antinicotinic activity, mg./kg. |
|---|---|---|---|---|
| A | 0.1 | +++ | 0.045 | 0.5 |
| 1 | 0.3 | +++ | 0.037 | 2 |
|  | 0.1 | +++ | 0.027 | 0.02 |
| 2 | 0.03 | +++ | 0.015 | 6 |
| B | 1 | ++ | 12 | 2.5 |
| 3 | 1 | +++ | 4.5 | 10 |
| 4 | 1 | +++ | 17 | 1 |

Action on the neuro-vegetative system

The activity was measured on male beagle dogs which had been anaesthetised with pentobarbitone. The animals were bivagatomized and the arterial pressure at the carotid artery was measured with a Ludwig manometer or a Statham pressure chamber.

The effects of the compounds were measured on adrenalinic and noradrenalinic hypertension, on acetylcholinic hypotension and on the hypotension produced by the excitation of the peripheral end of the vagus.

In Table 5, the intrinsic effect of the compounds, when intravenously administered, is expressed in mm. of mercury, preceded by the sign + for hypertension and − for hypotension and variations in the tensional effects of acetylcholine and vagal excitation are expressed in percentages of the base value.

The inhibition of intestinal motility is indicated by the following symbols:

+++: No motility
++: Considerably decreased motility (more than 50%)
+: Decreased motility (less than 50%)

The activity was measured on quaternary ammonium derivatives only.

TABLE 5

| Compound example No. | Dose, mg./kg. intravenous | Tensional variations, mm.Hg | Acetylcholinic hypotensional variations | Vagal hypotensional variations | Diminution of intestinal motility |
|---|---|---|---|---|---|
| B | 0.01 | 0 | −100 | −80 | + |
|  | 0.03 | 0 | −100 | −80 | +++ |
|  | 0.1 | 0 | −100 | −100 | +++ |
|  | 0.3 | 0 | −100 | −100 | ++ |
|  | 1 | −40 | −100 | −100 | ++ |
| 3 | 0.01 | 0 | −50 | −100 | ++ |
|  | 0.03 | 0 | −100 | −100 | +++ |
|  | 0.1 | −10 | −100 | −100 | +++ |
|  | 0.3 | −20 | −100 | −100 | +++ |
|  | 1 | −55 | −100 | −100 | +++ |
| 4 | 0.01 | 0 | −100 | −100 | ++ |
|  | 0.1 | 0 | −100 | −100 | ++ |

Ganglioplegic activity

The ganglioplegic activity was measured on the junction between the superior cervical ganglion and the nictitating membrane in cats, complete paralysis of the ganglion being denoted by 100. The results are shown in Table 6.

TABLE 6

| Compound example No. | Dose, mg./kg., intravenous | Effect |
|---|---|---|
| A | | 0 |
| 1 | | 0 |
| 2 | | 0 |
| B | | 0 |
| 3 | 2.56 | 4 |
|  | 5.12 | 12 |
| 4 | 0.08 | 4 |
|  | 2.56 | 41 |

Action of the intestinal transit

The action on the intestinal transit was measured on mice by the method described by Janssen and Jagenau, J. Pharm. Pharmacol., 2 (1957), No. 6 381–400.

The quaternary ammonium derivatives only were used for the erperiment. The results are expressed in terms of the 50% effective dose ($ED_{50}$) which inhibits the intestinal transit in 50% of the animals.

TABLE 7

| Compound example No. | $EC_{50}$, mg./kg. subcutaneous | $ED_{50}$, mg./kg. oral administration |
|---|---|---|
| B | 4 | 58 |
| 3 | 0.2 | 12 |
| 4 | 0.3 | 20 |

(B) Compounds containing a group of Formula II.—The pharmacological tests on the compounds of this group were carried out in comparison with N,N-diethyl-N-methyl-[2 - (9 - xanthenyl-carboxy)ethyl]-ammonium bromide or banthine (hereinafter denoted by (C), and the hydrochloride of the corresponding base (hereinafter denoted by (D).

Acute toxicity

The acute toxicity was determined by Deichmann and LeBlanc's method (Deichmann, W., and LeBlanc, T. J., J. Ind. Hyg. Toxicol., 25, (1943), 415–17). The approximate lethal doses in mg./kg. are shown in Table 1.

TABLE 1

| Compound example No. | Intravenous mouse | Subcutaneous— Mouse | Subcutaneous— Rat |
|---|---|---|---|
| 11 | 46 | 140 | 520 |
| 12 | 6.7 | 590 | 395 |
| C | 8 | 395 | 320 |
| 13 | 12 | 120 | 420 |
| 14 | 3.7 | 230 | 520 |
| D | 16 | 940 | >1,400 |
| 15 | 2.2 | 80 | 350 |

Experiments in vitro

Experiments in vitro were carried out by Magnus's method. The effects were measured on the following agonists:

Acetylcholine, on the duodenum of rats
Barium chloride, on the duodenum of rats
Histamine, on the ileum of guinea pigs
Nicotine, on the ileum of guinea pigs
Serotonin, on the color of rats.

The concentrations which inhibited 50% of the contractions due to the agonist were determined and are shown in Table 2.

TABLE 2

| Compound example No. | Acetylcholine | Barium chloride | Histamine | Nicotine | Serotonin |
|---|---|---|---|---|---|
| 11 | $7.10^{-9}$ | $6.10^{-6}$ | $6.10^{-9}$ | $1.10^{-8}$ | $6.10^{-7}$ |
| 12 | $3.10^{-9}$ | $1.10^{-4}$ | $7.10^{-7}$ | $5.10^{-7}$ | $6.10^{-6}$ |
| C | $7.10^{-10}$ | $>5.10^{-5}$ | $2.10^{-6}$ | $8.10^{-9}$ | $7.10^{-6}$ |
| 13 | $1.10^{-9}$ | $6.10^{-7}$ | $7.10^{-8}$ | $7.10^{-9}$ | $5.10^{-7}$ |
| 14 | $7.10^{-9}$ | $4.10^{-5}$ | $2.10^{-7}$ | $2.10^{-8}$ | $4.10^{-6}$ |
| D | $8.10^{-9}$ | $5.10^{-6}$ | $4.10^{-7}$ | $1.10^{-7}$ | $6.10^{-7}$ |
| 15 | $1.10^{-8}$ | $2.10^{-6}$ | $7.10^{-7}$ | $7.10^{-7}$ | |

Effect on behavior

The effect on behavior was measured with a Dews-type actimeter with intersecting electric beams. The mice were treated subcutaneously, half an hour before being introduced into the actimeter, and their activity was measured for 15 minutes. 6 different doses of each product, in logarithmically increasing amounts, were studied, and 6 mice were used for each dose.

The following symbols are used to denote the effects observed:

++ Considerable increase in activity
+: Increase in activity
±: Insignificant effect
—: Decrease in activity
— —: Considerable decrease in activity.

The results are shown in Table 3.

TABLE 3

| Compound example No. | Dose, mg./kg., subcutaneous | Effect |
|---|---|---|
| 11 | 0.1–0.3 | + |
|  | 1–10 | + + |
| 12 | 10–100 | — |
|  | 100–300 | — — |
| C | 10–30 | — |
|  | 100 | — — |
| 13 | 0.3–10 | + |
| 14 | 3–30 | — |
| D | 3 | + |
|  | 10–30 | + + |
| 15 | 10–30 | — |

Anticholinergic activity

The peripheral muscarinic anticholinergic activity was measured by the inhibition of chromodacryorrhoea produced by the administration of methacholine in rats.

The following symbols are used:

±: Slight effect
+: Considerable effect
++: Very considerable effect
+++: Very considerable and lasting effect (e.g. atropine).

The central anticholinergic activity was measured by the inhibition of analgesia in mice produced by oxotremorine.

The activity is expressed by the $ED_{50}$, i.e. the dose which, when subcutaneously administered 15 minutes before the oxotremorine, suppresses the analgesia due to oxotremorine in 50% of the animals.

The antinicotinic activity was measured by the inhibition of tremors produced in mice by the administration of nicotine.

The activity of the products is expressed by the $ED_{50}$, i.e. the dose which, when administered subcutaneously, suppresses nicotinic tremors in 50% of the animals.

The results are shown in Table 4.

TABLE 4

| Compound example No. | Peripheral anticholinergic activity Mg./kg. | Peripheral anticholinergic activity Effect | Central anticholinergic activity, mg./kg. | Antinicotinic activity, mg./kg. |
|---|---|---|---|---|
| 11 | 10 | +++ | 1.7 | 4.5 |
| 12 | 3 | +++ | 120 | 170 |
| C | 3 | +++ | 400 | 160 |
| 13 | 10 | +++ | 2.5 | 12 |
| 14 | 10 | +++ | (1) | 120 |
| D | (2) | (2) | 5 | 5.2 |
| 15 | 10 | +++ | (3) | (1) |

[1] Slightly active.
[2] No action.
[3] Inactive.

Action on the neuro-vegetative system

The activity was measured on male beagle dogs which had been anaesthetized with pentobarbitone. The animals were bivagatomized and the arterial pressure at the carotid artery was measured with a Ludwig manometer or a Statham pressure chamber.

The effects of the products were measured on adrenalinic and noradrenalinic hypertension, on acetylcholinic hypotension and on the hypotension produced by the excitation of the peripheral end of the vagus.

In Table 5, the intrinsic effect of the compounds, when intravenously administered, is expressed in mm. of mercury, preceded by the sign + for hypertension and — for hypotension and variations in the tensional effects of acetylcholine and vagal excitation are expressed in percentages of the base value.

The inhibition of intestinal motility is indicated by the following symbols:

+++: No motility
++: Considerably decreased motility (more than 50%)
+: Decreased motility (less than 50%)

The activity was measured on quaternary ammonium derivatives only.

15

TABLE 5

| Compound example No. | Dose, mg./kg. intravenous | Tensional variations, mm.Hg | Acetyl-cholinic hypotensional variations | Vagal hypotensional variations | Diminution of intestinal motility |
|---|---|---|---|---|---|
| 12 | 0.1 | 0 | −60 | −100 | ++ |
|  | 0.3 | −10 | −80 | −100 | +++ |
|  | 1 | −20 | −100 | −100 | +++ |
| C | 0.1 | 0 | −90 | −100 | ++ |
|  | 0.3 | −20 | −100 | −100 | +++ |
|  | 1 | −20 | −100 | −100 | +++ |
| 15 | 0.1 | −20 | −20 | 0 | + |
|  | 0.3 | −20 | −100 | −50 | +++ |
|  | 1 | −50 | −100 | −80 | +++ |

Action on the intestinal transit

The action on the intestinal transit was measured on mice by the method described by Janssen and Jageneau, J. Pharm. Pharmacol., 2 (1957), No. 6 381–400.

The quaternary ammonium derivatives only were used for the experiment. The results are expressed in terms of the 50% effective dose ($ED_{50}$) which inhibits the intestinal transit in 50% of the animals.

TABLE 6

Compound, ex. No.:     $ED_{50}$, mg./kg., subcutaneous
- 12 _____ 13.
- C _____ 12.
- 15 _____ Active in toxic doses.

According to the tests used (either in vitro: antispasmodic activity on isolated organs, or in vivo: central or peripheral anticholinergic activity (dacryorrhea)), the activity of the compounds is from 0.5 to 50 times that of an equivalent dose of atropine sulphate.

From the therapeutic point of view, the compounds may be used where atropine antispasmodics and central anticholinergic agents are indicated at doses from 0.5 to 25 mg./day orally or from 0.25 to 5 mg./day parenterally in any acceptable pharmaceutical form. For medicinal use, the compounds are used either in free base form or in the form of acid addition or quaternary ammonium salts that are pharmaceutically acceptable, i.e. non-toxic, at the doses used.

Suitable pharmacetically acceptable salts are, for example, salts of mineral acids, such as hydrochloric, hydrobromic, methanesulphonic, sulphuric or phosphoric acid, or of organic acids, such as acetic, proprionic, succinic, maleic, fumaric, tartric, citric, oxalic, benzoic, anthranilic or salicyclic acids, or substituted derivatives of these acids. Suitable pharmaceutically acceptable quaternary ammonium salts are, for example, derivatives of mineral esters, such as chloride, bromide, iodide, sulphate, methyl, ethyl, propyl, butyl, allyl or benzyl benzenesulphonate, or substituted derivatives of these esters.

The compounds of Formula I or their salts may be used therapeutically either alone or associated with excipients, diluents, coating agents, preserving agents, wetting, lubricating or auxiliary solution products, coloring agents, or perfumes provided that such associated materials are pharmaceutically acceptable and appropriate to the method of administration.

For oral administration, tablets, lozenges, powders, pellets or capsules, emulsions, suspensions, solutions or syrups may be used.

For parenteral administration, sterile aqueous or nonaqueous solutions, suspensions or emulsions or sterile powders to be dissolved at the time of use, may be used.

For rectal administration, suppositories may be used, and for external use solutions, emulsions, suspensions or ointments.

The composition of a tablet containing a compound of Formula I as active principle is given below by way of example.

16

|  | Mg. |
|---|---|
| 3-(2-cyclohexyl-2-hydroxy - 2 - phenyl-ethanoyloxy)-quinuclidine | 10 |
| Lactose | 60 |
| Maize starch | 17 |
| Stearic acid | 8 |
| Talcum | 5 | for a 100 mg. tablet.

What we claim is:

1. A composition which is pharmacologically effective with regard to cholinolysis, said composition comprising an effective anti-cholinergic amount of a compound of the formula

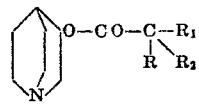

wherein R is H, OH or alkyl of 1 to 4 carbon atoms; $R_1$ is phenyl or thienyl and $R_2$ is cyclohexyl, cyclopentyl or thienyl; or when R is H, $R_1$ and $R_2$ form, together with the carbon atom to which they are attached, a tricyclic group of the formula:

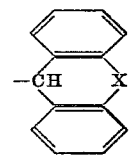

wherein X is —O—, —S—, or —$CH_2$—, or an acid addition or quaternary ammonium salt thereof, together with an inert, physiologically acceptable carrier.

2. The composition of claim 1 wherein said compound is 3-(2 - cyclohexyl - 2 - hydroxy-2-phenyl-ethanoyloxy)-quinuclidine.

3. The composition of claim 1 wherein said compound is 3-(2-cyclopentyl - 2 - hydroxy - 2 - phenyl-ethanoyloxy)-quinuclidine.

4. The composition of claim 1 wherein said compound is 1-methyl-3-(2-cyclohexyl-2-hydroxy-2-phenyl-ethanoyloxy)-quinuclidinium bromide.

5. The composition of claim 1 wherein said compound is 1-methyl-3-(2-cyclopentyl-2-hydroxy-2-phenyl-ethanoyloxy)-quinuclidinium bromide.

6. The composition of claim 1 wherein said compound is 3-[2-phenyl-2-(2-thienyl) - 2 - hydroxy-ethanoyloxy]-quinuclidine.

7. The composition of claim 1 wherein said compound is 3-[2-(2-thienyl)-2-cyclopentyl-2-hydroxy-ethanoyloxy]-quinuclidine.

8. The composition of claim 1 wherein said compound is 3-[2,2-di-(2-thienyl)-2-hydroxy-ethanoyloxy]-quinuclidine.

9. The composition of claim 1 wherein said compound is 1-methyl-3-[2,2 - di(2-thienyl)-propionyloxy]-quinuclidinium bromide.

10. The composition of claim 1 wherein said compound is 3-(2-cyclohexyl-2-phenyl-ethanoyloxy)-quinuclidine.

11. The composition of claim 1 wherein said compound is 3-[2-phenyl-2-(2-thienyl)-ethanoyloxy]-quinuclidine.

12. The composition of claim 1 wherein said compound is 3-(9-xanthenyl-carboxy)-quinuclidine.

13. The composition of claim 1 wherein said compound is 1-methyl-3-(9-xanthenyl-carboxy)-quinuclidinium bromide.

14. The composition of claim 1 wherein said compound is 3-(9,10-dihydro-9-anthracenyl-carboxy)-quinuclidine.

15. The composition of claim 1 wherein said compound is 1-methyl-3-(9,10 - dihydro - 9 - anthracenyl-carboxy)-quinuclidinium bromide.

16. The composition of claim 1 wherein said compound is 1-butyl-3-(9-xanthenyl-carboxy)-quinuclidinium bromide.

17. The composition of claim 1 wherein said compound is 1-ethyl - 3 - (9-xanthenyl-carboxy)-quinuclidinium bromide.

18. The composition of claim 1 wherein said compound is 3-(9-thioxanthenyl-carboxy)-quinuclidine.

19. The composition of claim 1 wherein said compound is 1-methyl-3-(9 - thioxanthenyl-carboxy)-quinuclidinium bromide.

References Cited

UNITED STATES PATENTS

| | | | |
|---|---|---|---|
| 2,075,359 | 3/1937 | Salzberg et al. | 424—250 |
| 2,648,667 | 8/1953 | Sternbach | 260—294.7 B |
| 3,405,134 | 10/1968 | Judd | 424—267 |

JEROME D. GOLDBERG, Primary Examiner

V. D. TURNER, Assistant Examiner

U.S. Cl. X.R.

260—293.53